United States Patent [19]

Stowman et al.

[11] Patent Number: 5,733,652

[45] Date of Patent: Mar. 31, 1998

[54] BANDING SYSTEM, BANDING TAPE AND METHODS OF USING THE SAME

[75] Inventors: Alesia A. Stowman, Woodbury; James J. Kobe, Newport, both of Minn.

[73] Assignee: Minnesota Mining and Manufacturing Company, St. Paul, Minn.

[21] Appl. No.: 386,854

[22] Filed: Feb. 10, 1995

[51] Int. Cl.$^6$ .................................. C09J 7/00; B31B 1/60
[52] U.S. Cl. .................. 428/343; 428/349; 428/218; 428/516; 428/520; 428/518; 428/354; 428/355; 156/60; 156/70
[58] Field of Search .................................. 428/192, 295, 428/294, 195, 343, 349, 218, 516, 518, 520, 354, 355; 156/60, 70

[56] References Cited

U.S. PATENT DOCUMENTS

| | | | |
|---|---|---|---|
| 2,559,990 | 7/1951 | Oace et al. | 117/122 |
| 4,024,312 | 5/1977 | Korpman | 428/343 |
| 4,540,619 | 9/1985 | Watanabe | 428/192 |
| 4,820,589 | 4/1989 | Dobreski et al. | 428/422 |
| 4,977,003 | 12/1990 | Brown et al. | 428/35.5 |
| 5,114,763 | 5/1992 | Brant et al. | 428/34.9 |
| 5,141,809 | 8/1992 | Arvedson et al. | 428/349 |
| 5,141,981 | 8/1992 | George et al. | 524/417 |
| 5,147,708 | 9/1992 | Brant et al. | 428/213 |
| 5,154,981 | 10/1992 | Brant et al. | 428/520 |
| 5,173,343 | 12/1992 | Arvedson et al. | 428/34.9 |
| 5,196,266 | 3/1993 | Lu et al. | 428/355 |
| 5,208,096 | 5/1993 | Dohrer | 428/218 |
| 5,354,597 | 10/1994 | Capik et al. | 428/152 |

FOREIGN PATENT DOCUMENTS

| | | |
|---|---|---|
| 0 443 263 | 8/1991 | European Pat. Off. . |
| 1-50351 | 10/1989 | Japan . |
| 2 057 916 | 4/1981 | United Kingdom . |
| 2058610 | 4/1981 | United Kingdom . |
| WO 92/11332 | 7/1992 | WIPO . |
| WO 92/11333 | 7/1992 | WIPO . |
| 92/22619 | 12/1992 | WIPO . |
| WO 94/21742 | 9/1994 | WIPO . |

OTHER PUBLICATIONS

*Handbook of Adhesives*, Skeist, Third Edition, Van Nostrand Reinhold, New York, 1990, pp. 11–15 and 573–578.
*Encyclopedia of Polymer Science*, vol. I, John Wiley & Sons, New York, 1985, pp. 511–515.

*Primary Examiner*—Patrick Ryan
*Assistant Examiner*—Cathy F. Lam
*Attorney, Agent, or Firm*—Gary L. Griswold; Walter N. Kirn

[57] ABSTRACT

The present invention provides a banding system, banding tape and method of using the same, each of which is particularly useful a variety of items such as flowers, straws, pens, pencils, newspapers, and vegetables. The banding system comprises a first strip and second strip. The first strip comprises an elastic polymeric material having a percent recovery of at least 50% after being elongated to 100% of its original length. The first and second strips are capable of being bonded together. The banding tape comprises a strip of elastic polymeric material having inner and outer surfaces and a nontacky layer on at least a portion of at least one of the surfaces. The method of using the banding system or tape of the invention comprises the steps of collecting one or more objects into a bundle, wrapping, stretching and securing the system or tape around the bundle, and allowing the elastic strip to at least partially recover to exert a compressive force on the bundle which holds the bundle together. The present invention further provides a bundle secured by either the novel banding system or banding tape, and tape comprising an elastic strip that has been printed with a bar code.

37 Claims, 2 Drawing Sheets

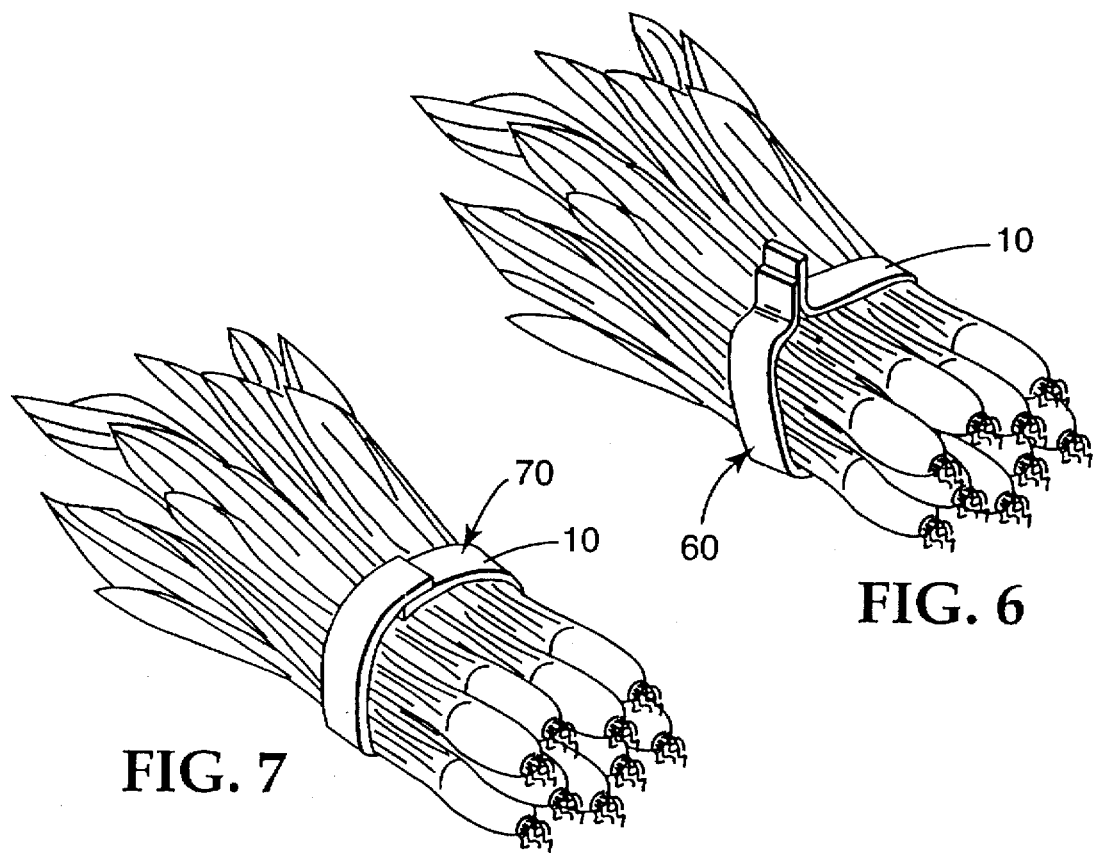
FIG. 6
FIG. 7
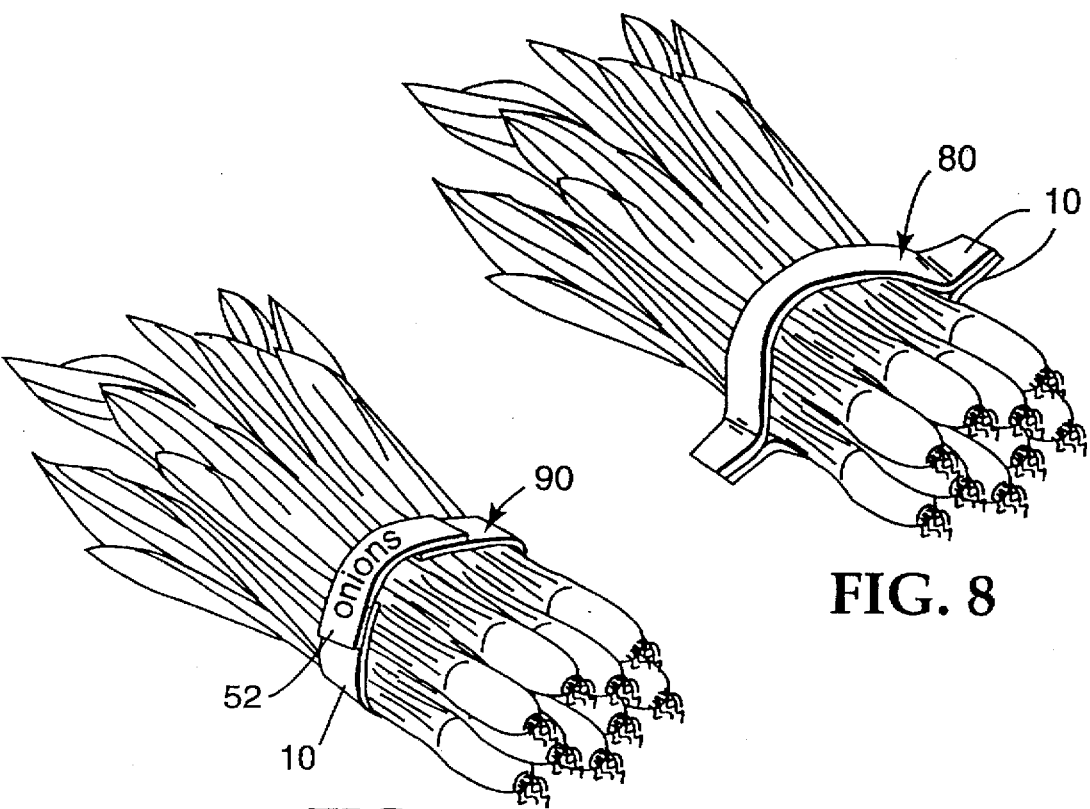
FIG. 8
FIG. 9

BANDING SYSTEM, BANDING TAPE AND METHODS OF USING THE SAME

FIELD OF THE INVENTION

This invention relates to a banding system, banding tape and methods of using the same.

BACKGROUND OF THE INVENTION

There are many items of commerce that are bundled together for shipment and sale. Vegetables (such as broccoli, green onions, carrots, celery, etc.), flowers, straws, pens, pencils, and newspapers are but a few of such items. The bundles are sized to provide the consumer with a convenient quantity of a given item. The bundles must remain secure during shipment and handling so they may be readily unloaded into stores and displayed for sale. The bundles must also remain secure to enable the store owner to place a price tag on the bundle.

In some cases, the bundles are provided with a label indicating information such as pricing, quantity, type of item, freshness data, name of vendor or grower. The label may comprise a bar code (such as a UPC code) that may be read by scanners at check-out stands. When the bundles are packaged, for example, in bags, then the label is conveniently affixed to the packaging. However, in some cases, the packaging does not allow for cost-effective and convenient labeling. For example, green onion, asparagus and broccoli are typically not labeled since the packaging for these vegetables typically comprises a rubber band which is not easily labeled. It would be especially advantageous to provide such information on the securing mechanism itself, thereby obviating the need to separately label each bundle.

One way to band or bundle these types of items is by using rubber bands. Rubber bands have the ability to stretch and recover, thereby exerting a compressive force on the bundle. This force prevents the items from slipping, shifting or coming loose. The rubber band must, however, be properly sized to accommodate a given bundle. If the rubber band is too small, it may crush and damage the items in the bundle, making them aesthetically unappealing and unacceptable to the consumer. Additionally, in the case of perishable items, crushing makes them prone to rotting. If the rubber band is too large, it may have to be wrapped around a bundle several times. This procedure is time-consuming and labor intensive; however, if not done, the rubber band may not adequately secure the items in a bundle. In the specific case of bundling vegetables, a grower may be required to keep an inventory of rubber bands to accommodate a variety of bundle sizes. This is inconvenient for the grower and requires close monitoring of the inventory of rubber bands of different sizes. Another disadvantage of using rubber bands is that they are typically applied manually. This is a very time-consuming and labor-intensive procedure, especially for a commercial vegetable grower with high produce yields. Furthermore, once vegetables are bundled, separate labels must often be applied to provide information about the produce since the rubber bands cannot accommodate such information themselves.

Another way to band or bundle foodstuffs is by using a stretchable wrapping material commonly referred to as "clingwrap". These materials are typically stretch-wrapped around a bundle several times to secure the bundle. Examples of stretchable wrapping materials and their uses may be found in U.S. Pat No. 5,147,708 (Brant et al.); U.S. Pat. No. 5,114,763 (Brant et al.); and U.S. Pat. No. 5,154,981 (Brant et al.); U.S. Pat. No. 5,173,343 (Arvedson et al.); U.S. Pat. No. 5,208,096 (Dohrer); and U.S. Pat. No. 4,820,589 (Dobreski). These materials tend to have low self-adhesion, thereby requiring large overlapping areas to remain intact around a bundle of articles. As a consequence, large quantities of material are needed to overwrap each bundle.

Another way to band or bundle items is by using a tape. Numerous references disclose such tapes, a sampling of which is described hereinafter.

JP Kokoku No. Hei 1(1989)-5-351 describes a self-adhesive binding tape comprising a pressure sensitive adhesive (PSA). This reference reports that the adhesion between the self-adhesive binding tape and the surface of the binding object is low, while the adhesion between two adhesive surfaces of the binding tape is high. The self-adhesive binding tape is stated to be useful for binding fresh vegetables, flowers, papers, newspapers, magazines and the like.

GB-A-2057916 and GB-A-2058610 (both to Ono et al.) describe a PSA tape comprising a substrate carrying a PSA that will bond firmly to itself substantially without creep, but will bond with a peelable bond to articles such as flowers or vegetables. The articles may be packaged by wrapping the tape around the articles and pressing together two adhesive-bearing surfaces of the tape to form permanent bonds. The tape slightly bonds with the articles to hold the articles in place, but may be peeled off the articles without inflicting damage thereto.

Other tapes are known for general bonding applications. Numerous references disclose such tapes, a sampling of which is described hereinafter.

U.S. Pat. No. 4,024,312 (Korpman) describes a highly conformable adhesive tape comprising a highly extensible and elastic backing film having a layer of pressure sensitive adhesive coated thereon. The reference states that the tape may normally be easily removed from an application surface by stretching it in a direction parallel to the plane of the surface.

WO 92/11332 (Kreckel et al.) describes a removable pressure sensitive adhesive (PSA) tape comprising a highly extensible backing bearing a layer of a photopolymerized acrylic PSA. The backing may be in the form of a single or multilayer film, nonwoven film, porous film, foam-like film, and combinations thereof. The backing may also be recoverable, preferably having a percent recovery greater than 75. The PSA tape firmly bonds to a substrate, but may be removed upon being stretched at an angle no greater than about 35° from the surface of the substrate. The reference further reports that the PSA tape may be removed from a substrate without leaving discernible adhesive residue on the substrate.

U.S. Pat. No. 4,977,003 (Brown et al.) describes an adhesive tape comprising a nontacky adhesive layer capable of forming strong bonds to many substrates under moderate pressure. The tape is initially repositionable to substrates of polyvinyl chloride, polycarbonate, polystyrene, corona-treated polyester, acrylate, vinyl chloride-vinyl acetate copolymer or shellac, the strength of the bond increasing in a short time after application.

PCT Patent Application WO 94/21,742 (Kobe et al.) describes a nontacky contact-responsive fastener system that can be repeatedly closed and opened. Preferred polymers for use as the contact-responsive layer include butadiene-acrylonitrile (BACN) polymers, butadiene-acrylonitrile-isoprene (BACNI) polymers, urethane acrylate polymers, butyl rubber polymers, two-part urethane polymers, styreneisoprene-styrene block copolymers and styrene-butadiene-styrene polymers.

U.S. Pat. No. 5,354,597 (Capik et al.) describes a microtextured elastomeric laminate tape comprising a laminate with at least one elastomeric layer and at least one thin skin layer and an adhesive layer, preferably prepared by coextrusion of the layers followed by stretching the laminate past the elastic limit of the skin layers and then allowing the laminate tape to recover. The tape is stated to be particularly useful in garment applications.

A drawback with some adhesive tapes is that they have a tendency to leave an adhesive residue on the bundled article. This would be especially undesirable in the situation where the bundled article comprises vegetables. Another drawback with some adhesive tapes is that they fail to properly secure a bundle due to the lack of sufficient tension on the bundle. In addition, oftentimes the bundle increases or decreases in size and the tape is not able to accommodate the new diameter. For example, when the bundle comprises perishable vegetables, it may shrink due to loss of moisture. Another drawback with some adhesive tapes is that they have a tendency to become contaminated with dirt or dust which could result in diminished adhesion and transfer of the contaminants to the bundled article. Still another drawback with some adhesive tapes is that a separate label is usually required to provide information about the bundle.

Although rubber bands, stretchable wrapping materials and adhesive tapes have been useful to bundle articles, there are limitations associated with each. Thus, there is a need for an improved banding system. More specifically, there is a need for a banding system which can easily accommodate a variety of bundle sizes with minimal quantity and labor requirements, can form strong to permanent bonds, has the properties of stretch and recovery to effectively secure articles despite any changes in bundle size and can accept indicia to provide information about the bundle. Preferably, the banding system is comprised of materials that comply with the Food and Drug Administration regulations for materials in contact with food and does not contaminate the bundled article.

SUMMARY OF THE INVENTION

The present invention provides a banding system for securing a bundle of one or more objects in compression, the system comprising:

(a) a first strip of an elastic polymeric material, the material having at least a 50% recovery after being elongated to 100% of its original length and (b) a second strip of material, wherein the first and second strips are capable of being bonded together and further wherein both of said strips do not comprise an elastic polymeric material bearing a layer of a normally tacky pressure sensitive adhesive thereon.

The elastic polymeric material has the properties of stretch and recovery which enable the provision of secure bundles of articles. The elastic polymeric material may be stretched around a bundle or object and bonded to a second strip. When released, the elastic material at least partially recovers, thereby exerting a compressive force on the bundle or object which keeps it intact. The elastic material is able to accommodate any changes in the diameter of the bundle which may be caused, for example, by moisture uptake or loss in the bundled article. The second strip to which the elastic strip may be bonded may be any of a variety of materials, including nonelastic, elastic, rigid and flexible materials. Preferably, the second strip is elastic and has a percent recovery of at least 50% when elongated to 100% of its original length.

In addition, either strip may be capable of accepting indicia including alphanumerics and bar coding. The indicia may provide useful information about the bundled article such as pricing, quantity, type of article, vendor, and the like. The provision of bar coding is especially useful in providing information that can be read by bar code scanners commonly used in many stores. It has been found that an elastic polymeric material may be provided with a bar code as long as the proportions of the bar code are preserved upon stretch and at least partial recovery of the material.

When the first and second strips of the banding system are thermoplastic, they may be bonded together by fusion. In general, fusion occurs when sufficient energy is applied to one or both substrates to cause at least one of the substrates to become molten so that the two substrates are bonded together upon contact, application of sufficient pressure, and cooling of the molten substrate(s). There are two types of fusion, indirect and direct. Indirect fusion occurs when two substrates are brought together to form an interface, and sufficient energy is provided at the interface to cause bond formation. Direct fusion occurs when the substrates are brought together after the application of energy to each substrate. Several methods are known for providing energy to a substrate for fusion bonding including, for example, heat sealing, ultrasonic welding, vibration welding, and spin welding.

Alternatively, a joining layer (such as, for example, an adhesive) may be applied to either or both of the strips. For example, the joining layer may be applied to both strips so that when they are brought together, a bond is formed. Alternatively, the joining layer may be applied to the first or second strip alone. The joining layer may be a normally tacky pressure sensitive adhesive, preferably one that does not leave adhesive residue on the bundled article, or a nontacky layer such as a contact-responsive polymer layer or a fusible layer. The term "nontacky" means that the layer has essentially no initial surface tack to paper. The term "contact-responsive" means that the polymer layer can adhere quickly to itself or a properly selected substrate upon contact or the application of light to moderate pressure.

Nontacky, contact responsive polymer layers (especially those comprising BACN or BACNI) are more readily able to bond to materials having similar solubility parameters. When the solubility parameters of the nontacky, contact-responsive polymer layer and material of the strip to which it is applied are sufficiently close, the degree of interaction between these materials is enhanced and bond formation is promoted. For further discussion of this and related bonding mechanisms, see the *Handbook of Adhesives* (Skeist, 3rd Edition, Van Nostrand Reinhold, New York, 1990, pages 11–15 and 573–578) and the *Encyclopedia of Polymer Science* (Volume 1, John Wiley & Sons, New York, 1985, pages 511–515).

Another type of nontacky layer is a fusible layer. A fusible layer may be activated by heat to an at least partially molten state. When such a molten fusible layer is sandwiched between two strips of material and allowed to cool, a bond forms between the strips. Suitable fusible layers include, for example, hot melt thermoplastic adhesives. The fusible layer may be applied to one strip, cooled and later reactivated when the two strips are to be bonded. Alternatively, the fusible layer may be inserted or applied between the two strips as a separate component before or after the application of heat.

Optionally, a tie layer is applied between the joining layer and the strip to improve the adhesion of the joining layer to the strip. A cover layer may also be optionally provided to protect the joining layer until it is used. Preferably, the cover layer comprises a release layer that is releasably adhered to the joining layer.

The present invention also provides an elastic banding tape comprising a strip of an elastic polymeric described above and a nontacky layer on at least a portion of one of said surfaces. The nontacky layer may comprise a contact-responsive layer or fusible layer such as those mentioned for the banding system of the invention. The tape may be flat, comprising inner and outer surfaces that are parallel to each other. The tape may also be provided to have a wide variety of cross-sectional shapes such as circular, oval, rectangular, triangular, etc.

The present invention also provides methods of using the banding system or elastic banding tape of the invention to secure a bundle of one or more objects in compression, comprising the steps of:

(a) providing the novel banding system or novel elastic banding tape;

(b) collecting one or more objects together;

(c) wrapping and stretching the banding system or elastic banding tape around the object(s) so that the elastic polymeric material is in a stretched condition;

(d) securing the banding system or elastic banding tape while the elastic polymeric material is in a stretched condition; and (e) allowing the elastic polymeric material to at least partially recover and exert a compressive force on the object(s) which secures and holds the bundle together.

The method may additionally comprise the steps of applying two surfaces of either the banding system or elastic banding tape together to form an interface and applying sufficient energy to the interface to form a bond. Energy may be provided, for example, by application of heat, ultrasonics, pressure or microwave energy. The method may additionally comprise the step of providing indicia on either the banding system or elastic banding tape. For example, a bar code may be printed on the elastic polymeric material in such a manner that upon stretching and at least partial recovery, the proportion and clarity of the bar code remains readable by a scanner.

The present invention further provides a bundle held in place by a compressive force. The objects are secured into the bundle by either the banding system or banding tape of the present invention.

Furthermore, the present invention provides an elastic banding tape for securing one or more objects in compression comprising a strip of an elastic polymeric material as described above and a bar code on at least a portion of the strip. A joining layer (such as those described above) may also be provided on one of the surfaces.

Although the banding system, banding tape and methods of using the same are particularly useful in banding or bundling vegetables, they may be used to band or bundle other articles such as perishable objects, straws, flowers, pens, and the like.

BRIEF DESCRIPTION OF THE DRAWINGS

The articles of the invention are illustrated in the accompanying drawings in which like reference numerals refer to the same elements.

FIG. 6 is an explanatory schematic view showing the use of the elastic banding tape of FIG. 1 to band a bunch of vegetables wherein the tape is bonded to form a fin seal.

FIG. 7 is an explanatory schematic view showing another use of the elastic banding tape of FIG. 1 to band a bunch of vegetables wherein the tape is bonded to form an overlapping seal.

FIG. 8 is another explanatory schematic view showing the elastic banding tape of FIG. 1 to band a bunch of vegetables. The two banding tapes are bonded together to form two fin seals, one on each side of the bunch of vegetables.

FIG. 9 is an explanatory schematic view showing the use of one embodiment of the banding system of FIG. 5 to band a bunch of vegetables. The banding system is bonded together to form two overlapping seals.

DETAILED DESCRIPTION OF THE INVENTION

The present invention will be further understood with reference to the accompanying figures which are provided to illustrate various embodiments of the invention. The figures are not an exhaustive representation of the invention.

Figure 1:
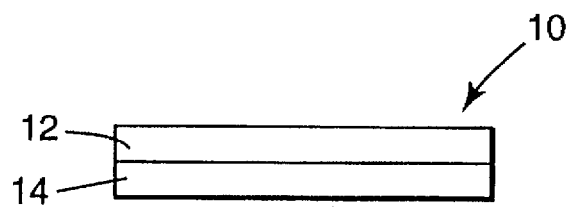
FIG. 1 is a side view of one embodiment of an elastic banding tape of the invention.

FIG. 1 shows an elastic banding tape 10 comprising a nontacky joining layer 12 coated on strip 14 of an elastic polymeric material. The nontacky layer may comprise a contact-responsive or fusible layer.

Figure 2:
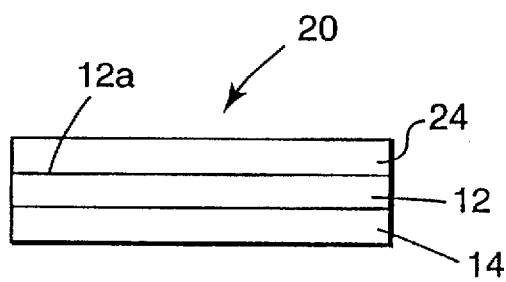
FIG. 2 is a side view of the elastic banding tape of FIG. 1 with a cover layer.

FIG. 2 shows an elastic banding tape 20 having a cover layer 24, such as a removable liner, removably adhered to surface 12a of the nontacky layer 12 to produce, for example, a dispensable tape. The cover layer 24 is adhered to surface 12a of the nontacky layer 12 with sufficient force to prevent unintentional removal before or during tape dispensing, thereby permitting use of the tape without contamination or premature bonding of the nontacky joining layer 12.

Figure 3:
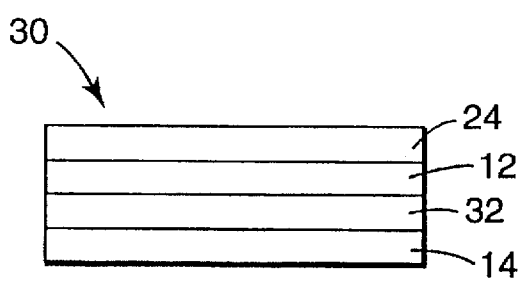
FIG. 3 is a side view of another embodiment of an elastic banding tape of the invention comprising a tie layer and cover layer.

FIG. 3 shows an elastic banding tape 30 having a tie layer 32 interposed between nontacky joining layer 12 and strip 14.

Figure 4:
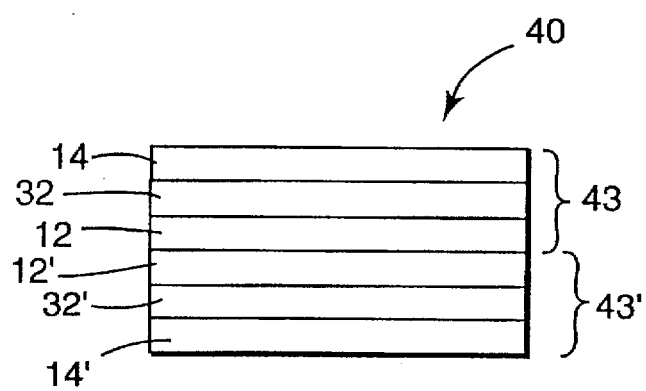
FIG. 4 is a side view of one embodiment of the banding system of the invention comprising two strips in aligned contacting relation with one another.

FIG. 4 shows a banding system 40 comprising two strips 43 and 43' in aligned contacting relation. The first strip 43 comprises elastic polymeric material 14 having an optional tie layer 32 and nontacky joining layer 12 applied thereto. The second strip 43' comprises elastic polymeric material 14' having an optional tie layer 32' and nontacky joining layer 12' applied thereto. Strips 43 and 43' may be provided with an optional cover layer (not shown) that would be removed before strips 43 and 43' are brought into contact as shown. Although not shown, it is also within the scope of the invention to eliminate one of the nontacky joining layers 12 and 12' and substitute the remaining nontacky joining layers 12 or 12' with a normally tacky pressure sensitive adhesive. It is also within the scope of the invention to substitute a nonelastic material for one of the elastic polymeric materials 14 or 14', and in this case, both of the nontacky joining layers 12 and 12' may be substituted with normally tacky pressure sensitive adhesives. A tie layer may also be interposed between the elastic polymeric material 14 and nontacky joining layer 12.

Figure 5:
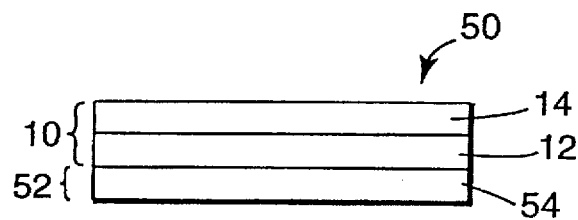
FIG. 5 is a side view of another embodiment of the banding system of the invention comprising two strips in aligned contacting relation with one another.

FIG. 5 shows a banding system 50 comprising a first strip 10 comprising elastic polymer material 14 having a nontacky joining layer 12 applied thereto in aligned contacting relation with strip 52. Strip 52 comprises material 54 which may be any suitable material (elastic or nonelastic) that is capable of bonding to strip 10. Although not shown, strip 52 may be provided with a joining layer. Nontacky joining layer 12 may also be substituted with a normally tacky pressure sensitive adhesive. Strip 10 could be provided with cover layer 24 (not shown) that would be removed before the strips contact each other.

FIG. 6 shows a bundle 60 comprising a bunch of green onions secured using the elastic banding tape 10 of FIG. 1. The ends of the elastic banding tape 10 of the invention were brought together such that the nontacky joining layer 12 was bonded to itself using moderate pressure to create a band around the onions. The bond formed may be described as a fin seal. When such a seal configuration is employed, the tape may be described as functioning in the peel mode.

FIG. 7 shows a bundle 70 comprising green onions secured using the elastic banding tape 10 of FIG. 1. The ends of a banding tape 10 of the invention were brought together in overlapping alignment so that the nontacky joining layer 12 contacted the elastic polymeric material 14 and, under moderate pressure, were bonded to each other to create a band around the onions. When the nontacky joining layer comprise a nontacky, contact-responsive polymer layer, strip 14 preferably comprises a material that has a solubility parameter that is sufficiently close to the solubility parameter of the nontacky, contact-responsive layer to enhance bond formation therebetween. The advantage of overlapping alignment is that the bonded area is in a shear mode, and the bond strength of the tape is typically greater in the shear mode than in the peel mode.

Not shown is an alternate banding configuration wherein a twist is introduced into the banding tape so that the nontacky layers of the two ends of the tape are able to be overlapped in a shear mode to form a bond.

FIG. 8 shows a bundle 80 comprising green onions secured using two banding tapes 10. The nontacky joining layers 12 of two pieces of tape of the invention were brought together at points approximately 180° from each other and under moderate pressure, were bonded to each other to create a band with two fin seals around the onions.

FIG. 9 shows a bundle 90 of green onions secured using the banding system of FIG. 5. The nontacky joining layer of strip 10 and strip 52 were brought together in overlapping alignment and under moderate pressure, were bonded to each other to create a band around the onions. Strip 52 was provided with indicia. Strip 10 could also be provided with indicia.

ELASTIC POLYMERIC MATERIAL

The first strip of the banding system of the invention comprises an elastic polymeric material. The elastic banding tape of the invention also comprises an elastic polymeric material. The elastic polymeric material of the banding system and banding tape of the present invention may be prepared from any suitable material as long as the material has percent recovery of about 50 to about 100% when measured according to the test method described below for Percent Recovery. In this test, the strip is elongated 100% of its original length, held under tension for 2 minutes and then allowed to relax for 2 minutes prior to the determination of Percent Recovery. The ability to recover after being stretched is an important property of the elastic polymeric material. This property allows the elastic strip to exert a compressive force on the banded articles and prevent them from shifting and eliminates the need for a PSA in direct contact with the banded article. The recoverable nature of the strip also allows it to accommodate variations in the diameter of the bundled articles. For example, when the banded article comprises vegetables, the vegetables oftentimes shrink or expand due to loss of moisture or moisture-uptake.

It is preferred that the elastic polymeric material have a percent recovery from about 65% to about 100%, and more preferably from about 80% to about 100%, when elongated to 100% of its original length. The elastic polymeric material is also preferably flexible, that is, capable of being bent to a radius of 0.5 cm without breaking. A flexible material is desirable so that the tape can conform to the articles and thus hold the bundle tightly. The elastic polymeric material can be in the form of a single layer or multiple layers. Polymers which may be used to prepare the elastic material include linear low density polyethylene; ultra low density polyethylene; low density polyethylene; polyurethane; polyolefin copolymers such as polyethylene/polypropylene and polyethylene/polybutylene; thermoplastic rubber such as ABA block copolymers; plasticized polyvinyl chloride; blends of vinyl acetate and elastomers; and combinations thereof. Mixtures or blends of any plastic or plastic and elastic materials such as polypropylene/polyethylene, polyurethane/polyolefin, polyurethane/polycarbonate, polyurethane/polyester, can also be used. Laminate materials such as those described in U.S. Pat. No. 5,354,597 (Capik et al.) may also be used as the elastic polymeric material as long as they have a percent recovery of at least 50% when elongated by 100%. Such materials may require pre-stretching to achieve the desired level of elasticity. Preferred materials are thermoplastic rubbers such as Kraton™ G2712X and Kraton™ G-7705, both commercially available from Shell Chemical Co., Houston, Tex.; low density polyethylene (LDPE) such as Petrothene™ NA 964-085 and Petrothene™ NA 960 Series, all commercially available from Quantum Chemical Corp., Cincinnati, Ohio; ultra low density polyethylene (ULDPE); low density polyethylene (LDPE) such as Polyethylene 2503.1, commercially available from Dow Chemical Co., Midland, Mich.; and blends thereof. These materials are preferred because they typically have a percent recovery of at least 65 when tested according to the procedure described below for Percent Recovery, are flexible and low cost. When the banding tape or banding system comprises an elastic material and a nontacky, contact-responsive joining layer, suitable materials for the layers may be selected on the basis of the similarity of their solubility parameters. However, if the solubility parameters are dissimilar, a tie layer may be employed between the joining layer and the elastic material. When the banding tape or system is to be fusion bonded, the elastic polymeric material preferably comprises a thermoplastic material such as polyethylene, poly(vinyl chloride), ethylene-carboxylic acid copolymer, polyolefin, polyurethane, or ethylene vinyl acetate material.

The strip of elastic material can be made using any of the several methods of film forming known in the art such as, extrusion, coextrusion, solvent casting, and the like. It can be any thickness so long as it possesses sufficient integrity to be processable and handleable. Typical thickness ranges are from about 0.0127 mm (0.0005 in) to about 1.27 mm (0.05 in), preferably from about 0.0127 mm (0.0005 in) to about 0.635 mm (0.025 in), more preferably from about 0.0127 mm (0.0005 in) to about 0.127 mm (0.005 in), and most preferably from about 0.0127 mm (0.0005 in) to about 0.051 mm (0.002 in). A thinner strip is preferred for cost reasons, but it must be thick enough to provide adequate tensile strength for a particular application and processing method. For example, when the banding tape or banding system is processed using production equipment or applied using application equipment, the strip should be able to withstand the tension produced in either case without tearing. The thickness of the strip must also be considered as it relates to the recovery force exerted by the material upon being stretched. The recovery force is the force exerted by an elongated strip of material to return to its natural state. The Peak Load test provided below is a measurement of the maximum recovery force exhibited by a strip of material elongated to 100% of its original state. In general, the recovery force increases relative to the thickness of the material. As a result, the thickness of the material may be selected to provide an appropriate level of recovery force. When, for example the banding tape or system is applied in such a way to form a fin seal such as illustrated in FIG. 6 (i.e., a peel mode application), it is desirable that the recovery force remaining upon bond formation and partial recovery of the elastic material be low to prevent failure of the bond in the peel mode of the tape but high enough to hold the articles in a bundle. More specifically, it is preferred that the remaining recovery force be less than the recovery force measured at 50% elongation. High remaining recovery forces exert a creep force on the tape bonded area which promotes bond failure. When the tape is used in a peel mode application, recovery forces for a 2.54 cm (1 in) wide strip are preferably less than 0.9 kg (2 lbs.), more preferably less than 0.45 kg (1 lb.), still more preferably less than 0.23 kg (0.5 lb.). When the tape is applied in such a way as to form an overlapping seal (i.e., a shear mode application), recovery forces are no longer as critical.

The recovery force appears to be directly proportional to the thickness of the strip for at least some materials. Table A supports this observation for a material made from Petrothene™ NA 964-085 with 4% by weight Remafin™ Blue AEW U-18. The Peak Load, a measurement of the recovery force exerted by a material upon being elongated 100% from its original state, was measured for three different thicknesses of this material using the test method given below. The data show that the Peak Load per unit length increased proportionately with the material thickness, so that the Peak Load per unit area remained relatively constant. Thus, a suitable material thickness may be selected to provide a recovery force that is appropriate for a particular application. Preferably, the recovery force of the strip of elastic polymeric material is less than the strength of any bond formed to prevent failure in the peel mode.

TABLE A

| Material Thickness mm (in) | Peak Load kg/cm (lb/in) | Peak Load/Thickness kg/cm$^2$ (lb/in$^2$) |
| --- | --- | --- |
| 0.0729 (0.00287) | 0.58 (3.2) | 172.8 (1114.9) |
| 0.095 (0.00374) | 0.83 (4.6) | 190.6 (1229.9) |
| 0.121 (0.00478) | 1.00 (5.6) | 181.6 (1172) |

The elastic polymeric material may contain additional ingredients including colorants, pigments, dyes, antioxidants, fillers, particulates and the like. Examples of colorants include Remafin™ Blue AEW U-18 (commercially available from Resco Colors, a subsidiary of Hoechst Canada Inc., Mississauga, Ontario) and #16180 Dark Blue Color Concentrate (commercially available from Ampacet, Tarrytown, N.Y.). Examples of antioxidants include Irganox™ 1520 and Irganox™ 1010 (both commercially available from Ciba Geigy). Examples of fillers include calcium carbonate, carbon black, glass beads, short fibers such as glass or nylon, silica, magnesium oxide, and talc. The incorporation of a filler tends to reduce the elasticity of the strip. Examples of particulates include conductive particulates such as thermally conductive and microwave susceptors. These additional ingredients can be present in the elastic polymeric material in an amount such that they do not substantially affect the bond performance and elastic properties of the novel banding tape and system. When used, antioxidants are typically present in an amount less than 2 parts by weight; fillers are typically present in an amount of from about 0.001 to about 20 parts by weight; and colorants are present in an amount of about 0.001 parts to about 10 parts by weight, each based on 100 parts by weight of the total elastic polymeric material.

It is also preferable that the elastic polymeric material be capable of accepting printed indicia such as a bar code and alphanumerics to provide information such as pricing, freshness date, manufacturing date, name of supplier and the like; although, such information may also be provided on the second strip. When the elastic polymeric material is printed with a bar code, then it is important that the relative bar code proportions be preserved upon stretching and at least partial recovery of the material so that the bar code remains readable by a scanner. In general, when the strip stretches and recovers uniformly, the bar code will remain readable.

SECOND STRIP

The second strip (or target strip) of the banding system of the invention may comprise any material that is capable of bonding to the first strip. The second strip may be elastic or nonelastic. Preferably, it is elastic, having at least a 50% recovery upon being elongated to 100% of its natural state. It may also be rigid or flexible. Preferably, the second strip is flexible, that is, capable of being bent to a radius of 0.5 cm without breaking. It is also preferable that the second strip be capable of accepting indicia such as a bar coding and alphanumerics, especially when the first strip comprises a microtextured elastic polymeric material. Bar codes are especially useful for prepackaged, prepriced bundles. When the second strip comprises an elastic material printed with a bar code, then it is again important that the relative bar code proportions be preserved upon stretching and at least partial recovery of the strip so that the bar code remains readable by a scanner. In addition, the second strip may also comprise time/temperature indicators to provide a means, for example, to monitor freshness of food items. Materials suitable for use as a second strip include those described above for the elastic polymeric material. Useful materials for the second strip include acrylonitrile-butadiene-styrene copolymers, polyester, polymethylmethacrylate, unplasticized polyvinylchloride, polystyrene, polyurethane, acetate, biaxially oriented polypropylene, polycarbonate, and rigid materials such as metal strips, ceramics, fiberglass, rigid polymeric materials, glass and the like. The second strip may comprise a single layer or a composite of two or more layers. The composite may comprise metallized layers, barrier layers, nonwoven material layers, polymer layers, paper layers, antistatic layers, primer layers, porous layers, foam layers, and the like. The layers may contain additives such as colorants; antioxidants; antistatic agents; fillers such as calcium carbonate, carbon black, glass beads, polymeric and glass bubbles; short fibers comprising materials such as glass or nylon, silica, magnesium oxide, talc; particulates such as thermally conductive particulates and microwave susceptors; and tackifying resins. The second strip may be made, for example, using hot melt extrusion, foaming, and nonwoven technologies.

JOINING LAYER

The elastic banding system of the invention may comprise a joining layer such as a nontacky layer (including a contact-responsive polymer layer and fusible layer) or a normally tacky pressure sensitive adhesive layer. The term nontacky means that the layer has essentially no initial surface tack to paper as measured by the PSTC-5 Quick Stick of Pressure Sensitive Tapes Test (also known as a Quick Tack Test in WO 94/21,742). Preferably, the nontacky layer is a contact-responsive polymer layer. Contact-responsive means that the polymer layer can bond quickly to itself or a properly selected substrate upon contact or the application of slight to moderate pressure. A properly selected substrate is one which has a solubility parameter sufficiently close to that of the nontacky, contact-responsive polymer layer to enable formation of a bond therebetween. This is particularly useful when the nontacky, contact-responsive polymer layer comprises BACN or BACNI.

The nontacky, contact-responsive polymer layer is capable of forming strong, preferably permanent bonds, especially after an extended period of time. This bond becomes stronger more quickly when heat and pressure are applied. A strong bond is one that remains secure and may be defined as one that provides a T-Peel Strength or Dynamic Shear Strength Value that is equal to or exceeds the remaining recovery force of the strip of elastic polymeric material upon bond formation and at least partial recovery. Preferably, T-Peel Strength values (as measured by the test method described hereinbelow) are at least 0.88 kN/m (5 lbs/in), preferably at least 1.4 kN/m (8.0 lbs/in), more preferably at least 1.75 kN/m (10 lbs/in), and most preferably at least 2.1 kN/m (12 lbs/in). Preferably, the Dynamic Shear Strength values (as measured by the test method described hereinbelow) are at least 172.25 kN/m$^2$ (25 lb/in$^2$), more preferably at least 344.50 kN/m$^2$ (50 lb/in$^2$). A permanent bond may be defined as a bond that satisfies either of the following:

(i) a bond that provides cohesive failure instead of failure of the joining layer at the bond interface of the two tapes or strips; or (ii) a bond that does not fail prior to deformation or failure of the strip.

Numerous polymeric materials may be used as the nontacky, contact-responsive polymer layer, provided they are capable of forming sufficiently strong bonds for a particular application. The polymeric material may be a homopolymer, a random copolymer, a block copolymer, or a graft copolymer. Specific examples of polymers useful as the non-tacky, contact-responsive polymer layer may include ethylene-containing copolymers, urethane polymers such as urethanes prepared by the reaction of an isocyanate and an isocyanate-reactive compound, acrylic and acrylate polymers, urethane-acrylate polymers, butyl polymer, butadiene-acrylonitrile (BACN) polymers and butadiene-acrylonitrile-isoprene (BACNI) polymers. Blends and mixtures of polymeric materials may be used if desired.

Additional discussion regarding polymers and compositions useful as the non-tacky, contact-responsive polymer layer may be found in a number of publications. For example, European Patent Pub. No. EP 0443263 (Miller et al.) discloses tackified block copolymer materials; U.S. Pat. No. 5,196,266 (Lu et al.) discloses urethane-acrylate materials; and U.S. Pat. Nos. 5,114,763; 5,141,809; 5,141,981 and 5,147,708 each disclose polyethylene-containing polymers with tackifiers, ethylene-vinyl acetate and acrylates.

Preferred polymers for use as the non-tacky, contact-responsive layer are selected from the group consisting of butadiene-acrylonitrile (hereinafter BACN) polymers and butadiene-acrylonitrile-isoprene (hereinafter BACNI) polymers. These polymers are described in U.S. Pat. No. 4,977,003 issued Dec. 11, 1990 to Brown et al.

The preferred BACN and BACNI polymers typically have from about 10% to about 50% by weight acrylonitrile units. Preferably, either polymer comprises from about 20% by weight to about 40% by weight acrylonitrile units. When the amount of acrylonitrile units is below about 20 weight percent, the polymer layer may be too soft for applications requiring very strong bonds. When the amount of acrylonitrile units is above about 40% by weight, the polymer layer may be rather firm, making it desirable to apply heat in addition to pressure during bonding. Additionally, the BACNI polymer typically contains from about 2% to about 30% by weight isoprene units. Preferably, these polymers are essentially uncrosslinked.

Either polymer (BACN or BACNI) may be processed by solvent coating or hot melt extrusion. Hot melt extrusion is preferred because it obviates the need to use solvents during processing; allows for direct coating of the nontacky, contact-responsive polymer layer directly onto the strip; and provides low material and processing costs. However, the temperatures used in hot melt processing BACN and BACNI polymers, typically in the range of 160° C.–182° C. (320°–360° F.), may cause crosslinking of the polymer to varying degrees. Also, the longer the polymer is kept at processing temperatures, the greater the amount of crosslinking that may occur. Crosslinking may adversely affect adhesion strength buildup of the nontacky, contact-responsive polymer layer.

Examples of commercially available BACN polymers include Nipol™ DN-401LL (which comprises 19 wt. % acrylonitrile and 81 wt. % butadiene and has a Mooney viscosity of 32–44), and Nipol™ DN-219 (which comprises 33 wt. % acrylonitrile and 67 wt. % butadiene and has a Mooney viscosity of 25–40), and Nipol™ DN-3335M (which comprises 33 wt. % acrylonitrile and 67 wt. % butadiene and has a Mooney viscosity of 30–40), all commercially available from Zeon Chemicals, Louisville, Ky.

Examples of commercially available BACNI polymers include Nipol™ DN-1201 L (which comprises 35 wt. % acrylonitrile, 65 wt. % butadiene and isoprene, and has a Mooney viscosity of 40–52) and Nipol™ DN-1201 (which comprises 35 wt. % acrylonitrile, 65 wt. % butadiene and isoprene and has a Mooney viscosity of 72.5–82.5), both commercially available from Zeon Chemicals, Louisville, Ky.

A preferred polymer for use in the present invention is Nipol™ DN-3335M (which comprises 33 wt. % acrylonitrile and 67 wt. % butadiene and has a Mooney viscosity of 30–40).

The nontacky, contact-responsive polymer layer may contain additional ingredients such as colorants; antistatic agents; antioxidants such as Irganox™ 1520 and Irganox™ 1010 (both commercially available from Ciba, Hawthorne, N.Y.); fillers such as calcium carbonate, carbon black, glass beads, polymeric or glass bubbles, short fibers comprising materials such as glass or nylon, silica, magnesium oxide, and talc; particulates such as thermally conductive particulates and microwave susceptors; and tackifying resins, preferably compatible with the nontacky, contact-responsive polymer layer. When the nontacky, contact-responsive polymer layer comprises BACN or BACNI, tackifying resins such as Escorez™ ECR 180 (commercially available from Exxon Chemical Americas, Houston, Tex.) and Staybelite™ Ester 3, 5, and 10 (commercially available from Hercules, Inc., Wilmington, Del.) may be used. In general, the use of a filler tends to reduce the peel strength of the polymer layer to articles which the polymer layer may accidentally brush against or incidentally contact. The use of a tackifying resin tends to increase peel strength of the polymer layer to itself or other substrates. Such additional ingredients can be present in the nontacky, contact-responsive polymer layer of the novel tape in an amount such that they do not substantially affect the nontacky and elastic properties of the novel banding system of the invention. When used, antioxidant is typically present in an amount less than 2 parts by weight; filler is typically present in an amount of about 0.01 to about 20 parts by weight; and tackifying resin is typically present in an amount up to about 50 parts by weight, each per 100 parts polymer.

In addition to a nontacky, contact responsive polymer layer, other joining layers may be used to provide the banding system of the invention such as fusible layers. Suitable fusible layers include adhesives that may be activated by heat, radiation or solvent. For example, hot melt thermoplastic adhesives comprising materials such as polyethylenes, polyolefins, ethylene-vinyl acetate copolymers, polyamides, polyesters, block copolymer rubbers, poly(vinyl butyral)s, poly(vinyl chloride)s, and ethylene-carboxylic acid copolymers may be used. The fusible layer may be applied to one strip, cooled and later reactivated when the two strips are to be bonded. Alternatively, the fusible layer may be inserted or applied between the two strips as a separate component before or after the application of heat. For example, a polyethylene powder may be applied to one strip, activated by heat, and then applied to the second strip.

In addition, other joining layers such as pressure sensitive adhesives may be used to provide the banding system of the invention. Pressure sensitive adhesives are normally tacky at room temperature, and can typically be adhered to a surface by application of light finger pressure. Such adhesives may be based on, for example, general compositions of polyacrylate, polyvinyl ether, natural rubber, isoprene, polychloroprene, butyl rubber, polyisobutylene, butadiene-acrylonitrile polymer, thermoplastic elastomer, styrene-butadiene polymer, poly-alpha-olefin, amorphous polyolefin, silicone, ethylene-containing copolymer (such as ethylene vinyl acetate, ethylene ethyl acrylate, ethylene n-butyl acrylate, and ethylene methyl acrylate), polyurethane, polyamide, epoxy, polyesters, and mixtures and copolymers thereof. The adhesive layer may also comprise, for example, tackifiers, plasticizers, fillers, antioxidants, stabilizers, pigments, curatives, crosslinkers, solvents, and the like. Conductive particulates (such as thermally or electrically conductive particles) or microwave energy absorbent particles may also be added.

Typically, these normally tacky pressure sensitive adhesives are not significantly detackified when applied to an elastic polymeric material and stretched to 100% or less of the natural state of the material.

Although one embodiment of the banding system of the present invention contemplates the use of a joining layer to enable the formation of bonds, other means may be used. For example, bonds may be formed without a joining layer by application of heat or ultrasonics or microwaves. In addition, mechanical fasteners such as staples may be used. The advantage of using a joining layer that bonds quickly to another substrate using pressure alone is that equipment (such as heating, dielectric bonding, microwave or ultrasonic equipment) is not required.

The nontacky layers (including contact-responsive polymer layers and fusible layers) described above for the banding system may also be used in the elastic banding tape of the invention. Preferably, the elastic banding tape comprises the preferred nontacky, contact-responsive polymer layer described above for the banding system.

The thickness of the joining layer may vary over a wide range. Preferably, the thickness of the joining layer is within the range of from 0.025 to 10.2 mm (0.001 to 0.040 in); although, thicknesses outside this range may be useful for certain applications within the scope of the invention. The joining layer may be applied to the strip using a wide variety of different techniques, including those techniques that are well known in the art. For example, the joining layer may be applied by solvent coating, extrusion coating (either simultaneously with the strip or separately), hot melt coating, calendering, curtain coating, gravure or pattern coating, spray coating, lamination, pressure feed die coating, knife coating, and the like. The joining layer may be continuous such as a uniform layer. The joining layer may also be discontinuous and applied in discrete portions, providing, for example, strips of polymer, bands, dots or other patterns of a joining layer. Furthermore, multiple layers of various joining layers may also be employed.

The particular characteristics of the joining layer may be selected to provide an appropriate level of bond formation and release characteristics for a particular application.

OPTIONAL TIE LAYER

The banding tape or system of the invention may optionally comprise a tie layer between the joining layer and the strip to which the joining layer is applied. The tie layer serves to promote adhesion between the joining layer and strip. This layer may be a primer layer. Selection of the tie layer will be dependent on the particular strip material and the type of polymer layer. For example, when the joining layer is Nipol™ DN-3335M and the strip comprises a low density polyethylene, a useful tie layer is a high tack pressure sensitive adhesive such as PTR Bostik H/M 9016 which is hotmelt coatable or Bostik™ Adhesive S-1133-57B which is solvent coatable, both commercially available from Bostik, Inc., Middleton, Mass.

Alternately, adhesion between the joining layer and a strip of material may be enhanced by chemical or mechanical treatment of the strip (such as by mechanical abrasion, corona treatment, or grafting of reactive monomers on the surface of the strip); selecting a material that has a similar solubility parameter to that of the joining layer, and by other methods well known to those skilled in the art. The selection of a strip having a suitable solubility parameter is especially useful in promoting adhesion when the joining layer comprises a nontacky, contact-responsive polymer, especially a BACN or BACNI polymer.

OPTIONAL COVER

The tape of the invention may also include a cover layer removably adhered to the joining layer. The cover layer serves to protect the joining layer from contamination from dust or dirt and from undesirably bonding to various surfaces before application to a bundle. A cover layer is also useful when the tape of the invention is provided in roll form, serving to separate the joining layer from the strip. The cover layer may comprise any material that has permanent release from the joining layer. For example, the cover layer may comprise a polyolefin, or a substrate having a low adhesion backsize (LAB) coating or a release coating on one of its surfaces such as a silicone coated paper.

Further embodiments of the invention are found in the following examples which are meant to be illustrative of the invention but non-limiting. In the examples, all parts are by weight unless otherwise noted.

TEST METHODS

The following test methods were used to measure the various test results reported in the examples.

PERCENT RECOVERY AND PEAK LOAD TEST

This test was performed on the strip alone as well as the composite tape of the invention as shown in FIG. 1. This test indicates the elastic response of the strip or tape. Elastic response is the ability of the sample to recover after being elongated. This test also measures the peak load the strip or tape is able to sustain after being elongated 100%. This is an indication of the internal strength of the strip and the composite tape. The test procedure was as follows:

Samples were slit in the down web direction (as opposed from cross web) to a width of 1.27 cm (½ in) and a length of 20 cm (8 in). Samples were marked in the middle with two lines that were 2.54 cm (1 in) apart. The two lines were perpendicular to the lengthwise dimension of the sample. This distance was L1 and denotes the "test area." Samples were tested using an Instron™ tensile tester (commercially available from Instron Corp., Canton, Mass.) with the distance between the jaws set at 5.08 cm (2 in). The sample was clamped in the jaws so that the test area was centered between the upper and lower jaws and elongated in the lengthwise (or machine direction) until the jaws of the Instron tensile tester increased the gap by 5.08 cm (2 in), i.e., 100% elongation, at a crosshead speed of 30.48 cm/min (12 in/min). The Instron tensile tester was stopped at this point and the test sample was held in tension for 2 minutes. After the 2-minute holding period, the tension was removed and the sample was allowed to relax for 2 minutes. Then the distance between the two lines was remeasured to give stretched length, L2. The Percent Recovery was determined by the following equation:

$$\% \text{ Recovery} = 100 - \left( \frac{(L2 - L1) \times 100}{L1} \right)$$

The Percent Recovery was the average of 3 replicate samples unless otherwise noted. The desired percent recovery of the strip alone is from about 50% to about 100%. The desired percent recovery of the composite tape is from about 50% to about 100%, preferably greater than 65%.

The Peak Load was determined by finding the maximum force value exhibited by a sample during an elongation of 100%. This value was obtained from a recording chart in pounds. This value was then converted to kilograms and divided by the width of the sample to give the Peak Load in kilograms/centimeters (kg/cm). The reported Peak Load was the average of 3 replicate samples unless otherwise noted.

T-PEEL STRENGTH

Two samples of composite tape having the dimensions of 2.54 cm (1 in)×15.24 cm (6 in) were tested. Two tape samples were aligned on top of each other so that the joining layer of the first tape contacted the joining layer of the second tape. These tapes were then pressed together using two passes of a 2 kg. (4.5 lb) hard rubber roller, the roller traveling in opposite directions for each pass at a rate of 30.5 cm/min (12 in/min). The test sample was allowed a 15 second dwell at room temperature. Two immediately adjacent free ends of the sample were clamped in the jaws of an Instron™ tensile tester and pulled apart at a crosshead speed of 30.5 cm/min (12 in/min). The T-Peel Strength value was reported as the average value over a 11.4 cm (4.5 in) length of test sample. Replicates were run and the average value reported in kilonewtons/meter (kN/m). This test is an indication of how quickly and strongly a joining layer will bond to itself.

180° PEEL STRENGTH

This test was run according to ASTM D-1000 except that the joining layer-bearing strip was applied to various rigid materials having different solubility parameters using a 2-kg (4.5 lb) hard rubber roller, one pass in each direction at a rate of 30.5 cm/min (12 in/min). Testing was carried out after about 10 minutes dwell at ordinary room temperature. The peel rate was 30.5 cm/min (12 in/min).

90° PEEL STRENGTH

This test was run according to PSTC-5. Samples were prepared by applying the joining layer surface of a tape comprising a nontacky, contact-responsive joining layer on a polyester strip to various rigid substrates. The tape was applied to the rigid substrate using two passes of a 2-kg (4.5 lb) hard-rubber roller, one pass in each direction at a rate of 30.5 cm/min (12 in/min). Samples were allowed to dwell for the specified time and temperature before being separated at a rate of 30.5 cm/min (12 in/min).

DYNAMIC SHEAR STRENGTH

This test was used to determine the mount of shear force required to either cause two tapes having nontacky, contact-responsive polymer layers to release from each other. Although not done, this test could also have been used to determine the amount of shear force required to cause a strip having a nontacky, contact-responsive polymer layer and a target or second strip to release from each other. A pair of 2.5 cm×10 cm (1 in×4 in ) strips were secured together with a 6.45 cm² (1 in²) overlap. The strips were pressed together using two passes of a 2-kg (4.5 lb) hard-rubber roller, one pass in each direction at a rate of 30.5 cm/min (12 in/min). After at least a 15-second dwell at room temperature, one end of each strip was secured to a jaw of an Instron tensile tester, and the jaws were separated at a rate of 30.5 cm/min (12 in/min).

The following abbreviations represent commercially available materials used in the examples:

| | |
|---|---|
| BOPP | Biaxially oriented polypropylene |
| BACN | Butadiene-acrylonitrile polymer |
| BACNI | Butadiene-acrylonitrile-isoprene polymer |
| CA | Cellulose Acetate |
| MEK | Methyl ethylketone |
| PC | Polycarbonate |
| PE | Polyethylene |
| PET | Poly(ethylene terephthalate) |
| PMMA | Poly(methyl methacrylate) |
| PP | Polypropylene |
| PS | Polystyrene |
| PVC | Poly(vinyl chloride) |
| BACN-1* | Nipol ™ DN3335M, 33 wt. % acrylonitrile, Mooney viscosity range [30–40], containing about 1 wt. % antioxidant |
| BACN-2* | Nipol ™ DN-401LL, 19 wt. % acrylonitrile, Mooney viscosity range [32–44] |
| BACN-3* | Nipol ™ DN-1031, 41 wt. % acrylonitrile, Mooney viscosity range [55–70] |
| BACN-4* | Nipol ™ DN-219, 33 wt. % acrylonitrile, Mooney viscosity range [25–40] |
| BACN-5* | Nipol ™ DN-1032-45, 33 wt. % acrylonitrile, Mooney viscosity range [40–55] |
| BACN-6* | Nipol ™ DN-2835, 28 wt. % acrylonitrile, Mooney viscosity range [30–40] |
| BACN-7* | Nipol ™ DN-3635, 36 wt. % acrylonitrile, Mooney viscosity range [30–40] |
| BACN-8* | Hycar ™ 1022, (now known as Nipol ™ 1022), |

-continued

| | |
|---|---|
| | 33 wt. % acrylonitrile, Mooney viscosity range [40–55] |
| BACNI-1* | Nipol DN-1201L, 35 wt. % acrylonitrile, 65 wt % butadiene and isoprene, Mooney viscosity range [40–52] |
| TIE-1 | PTR Bostik H/M 9016 rubber-based hotmelt adhesive from Bostik, Inc., Middleton, MA |
| TIE-2 | Bostik Adhesive S-1133-57B (from Bostik, Inc., Middleton, MA), a solution of 65% by weight solids rubber-based adhesive in a 1:1 mixture by weight of toluene and MEK |

*All these materials contain some level of antioxidant.
Nipol is a trademark of Zeon Chemicals, and Hycar is a trademark of B. F. Goodrich.

EXAMPLE 1

Testing of Various Materials to Determine Recoverability

Various materials were tested according to the test methods outlined above for Peak Load and Percent Recovery. The strips are described and test results are presented in Table 1.

TABLE 1

| Strip | Strip Material | Resin or Commercial Product | Peak Load kg/cm (lbs/in) | % Recovery |
|---|---|---|---|---|
| 1 | 0.118 mm (0.00465 in) extruded blue PE film | Petrothene ™ NA 960–000[1] resin extruded with 3 wt. % Remafin Blue AEW U-18[2] pigment | 1.69 (9.5) (Average of 10) | 77.6 (Average of 20) |
| 2 | 0.102 mm (0.004 in) extruded clear embossed PE film | Petrothene NA 964–085[1] resin | 0.9 (5.1) | 70.08 |
| 3 | 0.095 mm (0.00374 in) extruded blue PE film | Petrothene NA 964–085[1] resin extruded with 4 wt. % Remafin Blue AEW U-18[2] pigment | 0.82 (4.6) (Average of 10) | 70.47 (Average of 20) |
| 4 | 0.0729 mm (0.00287 in) extruded blue PE film | Petrothene NA 964–085[1] resin extruded with 4 wt. % Remafin Blue AEW U-18[2] pigment | 0.572 (3.2) | 53.01 |
| 5 | 0.121 mm (0.00478 in) extruded blue PE film | Petrothene NA 964–085[1] resin extruded with 4 wt. % Remafin Blue AEW U-18[2] pigment | 1.00 (5.56) | 58.27 |
| 6 | 0.2 mm (0.008 in) extruded white PE film | Petrothene NA 964–085[1] resin extruded with 5 wt. % Spectratech CM 80582[3] | 2.3 (12.85) | 81.89 |
| 7 | 0.15 mm (0.006 in) urethane film | 3M Polyurethane Protective Tape SJ8675 without liner[6] | 1.4 (7.96) | 98.43 |
| 8 | 0.0234 mm (.00092 in) white pigmented polyester film | Melinex 329/92[3] Film | 3.6 (20.3) | 25.46 |
| 9 | 0.05 mm (0.002 in) extruded clear embossed PE film | Petrothene NA 964–085[1] Resin | 0.95 (5.30) | 66.800 |
| 10 | 0.102 mm (.004 in) extruded and calendered green plasticized PVC film | plasticized PVC resin | 2.6 (14.70) | 43.83 |
| 11 | 0.05 mm (0.002 in) clear BOPP film | Treax TX200-0 Clear Film[4] | 5.83 (32.64) | 35.58 |
| 12 | 0.04 mm (0.0016 in) extruded vinyl film | 1.6 mil Clear Vinyl Gloss/Matte Film RV407[5] | 2.85 (15.93) | 0.0(sample broke) |
| 13 | 0.1 mm (0.004 in) extruded clear PE film | GF-10 Film[7] | 1.53 (8.58) | 62.86 |

[1]Quantum Chemical Corp., Cincinnati, OH
[2]Resco Colors, a subsidiary of Hoechst Canada, Inc., Mississauga, Ontario, Canada
[3]ICI Films, Wilimington, DE
[4]Toray Plastics America Inc., North Kingstown, RI
[5]Borden Inc., Columbus, OH
[6]Minnesota Mining and Manufacturing Co., St. Paul, MN
[7]Consolidated Thermoplastics Company Suitable elastic polymeric materials for the invention are those that have percent recovery of at least 50.

EXAMPLE 2

Preparation of a Tape by Hot Melt Coating Various Layers

COATING OF THE NONTACKY, CONTACT-RESPONSIVE LAYER

A 2.54 cm (1 in) diameter×30.5 cm (12 in) long rope of BACN-1 was fed into a 5.1 cm (2 in) Bonnot extruder (commercially available from The Bonnot Co., Green, Ohio). The rope was heated in the extruder to 182° C. (360° F.), and then pushed into a Zenith 20 $cm^3$ pump (commercially available from Parker Hannisin Corp., Sanford, N.C.). There were no screens between the extruder and the pump. The pump was turned to a setting of 30 RPM giving a power load of 2.5 amps. With a 30 RPM setting, the Bonnot extruder to pump pressure was 12,755 $kN/m^2$ (1850 psi). From the pump, the material entered a 1.6 cm (0.625 in) I.D. hose also heated to 182° C. (360° F.). The hose length was 0.914 m (3 feet) and lead to a 15.2 cm (6 in) coating die. The material passed through the coating die to provide a 11.4 cm (4.5 in) wide coating. The coating was laid down on the higher release side of a 15.2 cm (6 in) wide and 0.001 cm to 0.0011 cm (0.0004 to 0.00045 in) thick silicone treated paper liner (commercially available from Akrosil as Grade SBL 60 SC Silox G1W/G7C, Akrosil, Menasha, Wis.). The backing roll on which the coating took place was kept at 10° C. (50° F.). The line speed was 2.7 m/min (9 feet per minute) to give a coating weight of 71.3 $grams/m^2$ (17 grains/24 $in^2$). This material was wound up and used as input material for coating of the tie layer.

COATING OF TIE LAYER

An 18.9 liter (5 gallon) pail of TIE-1 was melted using a platen having a temperature of 204° C. (400° F.). The molten material was gear pumped using a 18.9 liter (5 gallon) hot melt adhesive applicator (commercially available from Graco/LTI, Minneapolis, Minn.) through a heated hose using a hose temperature of 182° C. (360° F.). The same coating die used for coating of the nontacky layer was used to coat the tie layer. The tacky PSA tie layer was coated against a back-up roll set at a temperature of 21° C. (70° F.). From the die, the tacky PSA tie layer was coated onto the nontacky, contact-responsive polymer joining layer prepared above to form a composite of tie layer, joining layer and liner. Strip 1 from Example 1 was laminated with its matte side to the tie layer to produce a laminate. This laminate was then fed through a closed nip having a tension of 275.77 $kN/m^2$ (40 lb/in$^2$) to marry the film, tie layer and polymer. The liner was removed and the laminate was then slit to 1.27 cm (0.5 in) width and wound onto planetary rolls to produce a tape of the invention. The tape was tested for Peak Load and Percent Recovery and compared to various commercially available tapes. Results are presented in Table 2 below.

EXAMPLE 3

Preparation of a Tape by Solvent Coating Various Layers

COATING OF THE NONTACKY LAYER

A 25% solids content by weight solution of BACN-1 was prepared by adding chopped pieces having an approximate size of 10 cm×2.5 cm×2.5 cm (4 in×1 in×1 in), to methyl ethyl ketone (MEK) in a 1514 liter (400 gal) stainless steel kettle with a Model x Jac-1001 Lightning mixer (available from Stainless Fabrication, Inc., located in Springfield, Mo.) for about 48 hours to form a homogeneous solution. The homogeneous solution obtained above was then coated using a pressure-feed slot die at a wet thickness of 201 g/m$^2$ (48 grains/24 in$^2$) onto the higher release side (G7C) of the same liner of Example 2 except that the liner was 33 cm (13 in) wide. A three-zoned oven was used with zone temperature settings of 57.2° C. (135° F.), 71° C. (160° F.), and 143.3° C. (290° F.) to remove the solvent from the coating. The coated liner was passed through the oven at a speed of 3.66 meters (12 feet) per minute. The nontacky, contact-responsive polymer joining layer dry coating weight was 50.32 grams/m$^2$ (12 grains/24 in$^2$). The nontacky contact-responsive polymer joining layer coated liner was then wound up for coating of the tie layer.

COATING OF TIE LAYER

TIE-2 was pressure fed into a slot die and coated onto the nontacky, contact-responsive polymer layer prepared above. The tie layer was coated to give a layer of solution having a wet thickness of 38.58 g/m$^2$ (9.2 grains/24 sq. in). The tie layer-coated polymer was passed through a three zoned oven having temperature zones of 60° C. (140° F.), 74° C. (165° F.), and 177° C. (350° F.) to dry and remove residual solvent. The Tie-2 dry coating weight was 25.16 g/m$^2$ (6 grains/24 in$^2$). Using the same general laminating procedure and strip 3 of Table 1, a laminate of strip material, tie layer, nontacky polymer layer, and liner was prepared using a nip tension of 55.2 kN/m$^2$ (8 lb/in$^2$). The liner was removed and the laminate was slit to 1.25 cm (0.5 in) wide and wound onto a level wound roll to produce a tape of the invention. The tape was tested for Peak Load and Percent Recovery. Results are presented in Table 2 below.

Two pieces of the tape were used to bundle asparagus using automated equipment and 4 rolls of tape. The machine stretched two pieces of tape around the tops and bottoms of each bundle and applied pressure to the tape ends to form two fin seals around each bundle. The bundled asparagus was boxed and shipped. One fin seal on each bundle was observed to have separated during shipment, possibly due to an inadequate bond area on one of the fin seals and/or the inability of the bond to withstand the remaining recovery forces of the tape. The tape of this example was also used to bundle green onions. Again, a machine stretched two pieces of the tape around each bundle and applied pressure to form two fin seals. As the bundled onions came off the machine, the bundles appeared to be held together tightly. The onions were boxed and shipped to a receiving center. After shipping, 21.5% of the bundles remained secured. The bond failures occurred on one side and again were possibly due to an inadequate bond area and/or the inability of the adhesive bond to withstand the recovery forces of the tape. A heating gun was also used with the tape of this example to facilitate formation of the bonds. The use of heat improved the ability of the tape to withstand the remaining recovery forces.

EXAMPLE 4

Preparation of a Tape by Solvent Coating Various Layers

A tape of the invention was prepared according to the procedure of Example 3 except that Strip 2 of Example 1 was used as the strip material in place of the blue polyethylene film. The tape was tested for Peak Load and Percent Recovery. Results are presented in Table 2 below. The tape was also used to bundle green onions using automated equipment and four rolls of tape as in Example 3. As the bundled onions came off the machine, the bundles appeared to hold together tightly. The onions were boxed and shipped to a receiving center. After shipping, 88% of the bundles remained secured. Bond failures may have been due to insufficient bond area and the inability of the bond to withstand the recovery forces of the tape. It is believed that optimization of the film recovery strength and strip peel strength could have eliminated these failures.

Comparative Examples 1–4

Four commercially available tapes were tested for Peak Load and Percent Recovery for comparison to Examples 2–4. The results are given in Table 2. The tapes corresponding to comparative examples C-1, C-2, C-3, and C-4 are described in the footnotes which appear below Table 2.

TABLE 2

| Example No. | Peak Load kg/cm (lb/in) | % Recovery |
| --- | --- | --- |
| 2 | 1.7 (9.43) | 91.07 |
| 3 | 1.5 (8.39) | 74.67 |
| 4 | 1.5 (8.5) | 67.45 |
| C-1[1] | 4.4 (25.57) | 0.0 (sample broke) |
| C-2[2] | 2.0 (11.2) | 47.11 |
| C-3[3] | 1.3 (7.52) | 64.83 |
| C-4[4] | 2.34 (13.09) | 92.39 |

[1]tesafilm ™ 4104, tesa, Inc., Charlotte, N.C., overall thickness 0.066 mm (.0026 in)
[2]Scotch ™ Brand Stretchable Tape No. 8886, Minnesota Mining and Manufacturing Co., St. Paul, MN, overall thickness 0.15 mm (0.006 in)
[3]Scotch ™ Brand Stretchable Tape No. 8884, Minnesota Mining and Manufacturing Co., St. Paul, MN, overall thickness 0.10 mm (0.004 in)
[4]Scotch ™ Vinyl Plastic Electric Tape 33+, Minnesota Mining and Manufacturing Co., St. Paul, MN, overall thickness 0.178 mm (0.007 in)

Results

From the data in Table 2, it appears that the tapes of Examples 2, 3, and 4 provide acceptable peak load values while exhibiting percent recovery values greater than 65. Comparative C-1 provided a higher peak load value, however, this sample broke when an attempt was made to elongate the material according to the test procedure. As such, C-1 would not be suitable for the present invention. C-2 also failed to exhibit an acceptable percent recovery value. It is to be noted that although C-2 is described as being a "stretchable" tape, it did not exhibit a percent recovery greater than 50%. Thus, stretchability does not necessarily imply recoverability or elasticity.

The strip of C-3 provided peak load and percent recovery values that were comparable to those of Examples 2, 3, and 4. The vinyl tape of C-4 exhibited higher peak load and percent recovery values than the polyethylene strips of Examples 2, 3, and 4, but is generally not approved by the FDA for applications involving contact with food.

EXAMPLES 5-12

T-Peel Strength of Various Tapes

Various nontacky, contact-responsive tapes were prepared using hot melt coating techniques and tested according to the T-Peel Strength test. The tapes were prepared by feeding 2.5 cm (1 in) wide×15 cm (6 in) long strips of BACN polymer into a twin screw Haake Rheocord extruder (commercially available from Haake, Inc., Saddlebrook, N.J. 07662). The extruder zone temperatures were 149° C. (300° F.), 177° C. (350° F.), and 182° C. (360° F.). From the extruder, the material entered a 0.91 m (3 feet) long hose having an inner diameter (I.D.) of 1.6 cm (0.625 in) and temperature of 182° C. (360° F.). The temperature of the melted polymer in the hose was 126° C. (258° F.). The material was forced through a coating die set at 182° C. (360° F.) and coated onto one side of 0.039 mm (0.00155 in) thick white polyester. The white polyester had a 0.051 mm (0.002 in) thick tacky PSA protected with a paper liner on the side opposite to the side upon which the BACN was coated. The backing roll on which the coating took place was set at 12° C. (54° F.). The line was pulled at a speed to give a coating weight of 63 grams/m² (15 grains/24 in²) equivalent to 0.051–0.076 mm (0.002–0.003 in) in thickness.

Test strips were prepared and tested according to the procedure described above for T-Peel Strength. The BACN polymer used and the T-Peel Strength values are reported in Table 3 below. All values are the average of two replicates unless otherwise indicated.

TABLE 3

| Example No. | Polymer | T-Peel Strength kN/m (lb/in) |
| --- | --- | --- |
| 5 | BACN-2 | 0.459 (2.63) |
| 6ᵃ | BACNI-1 | 0.478 (2.73) |
| 7ᵇ | BACN-3 | 0.239 (1.37) |
| 8ᶜ | BACN-1 | 0.366 (2.09) |
| 9 | BACN-4 | 0.386 (2.21) |
| 10 | BACN-5 | 0.305 (1.74) |
| 11ᶜ | BACN-6 | 0.340 (1.94) |
| 12 | BACN-7 | 0.247 (1.41) |

ᵃaverage of 6 replicates
ᵇaverage of 4 replicates
ᶜsingle data point.

This example demonstrates that different BACN polymer materials provide different T-Peel Strength values when mated to itself. Thus, by proper selection of a BACN, tapes having the desired T-Peel Strength values may be obtained. It is expected that the T-Peel Strength values reported above would significantly increase by increasing the 15 second dwell time used in performing the test.

EXAMPLES 13-16

T-Peel and Dynamic Shear Strength of Tapes having Different Strip Materials Various tapes comprising nontacky, contact-responsive polymer layers were prepared and tested for T-Peel Strength and Dynamic Shear Strength.

In Examples 13, 14, and 15, the BACN polymer was hot melt coated according to the procedure of Examples 5–12 onto a strip of material. In Example 16, the BACN polymer was coated onto the strip of material from a solvent solution using the procedure described in Example 3. Various composite strips were used for the T-Peel Strength test and for the Dynamic Shear Strength test and are outlined in Table 4 below.

TABLE 4

| Composite Strip Materials | Description |
| --- | --- |
| A | Same white polyester film described in Examples 5–12 |
| B | Composite Strip A reinforced with 0.046 mm (0.0018 in) clear cellophane tape over the PSA |
| C | 0.076 mm (0.003 in) thick clear PET |
| D | Composite Strip C reinforced by lamination to the PSA surface of Composite Strip A bearing a 0.51–0.076 mm (0.002–0.003 in) layer of BACN-4 coated on the side opposite the PSA |

The T-Peel Strength test procedure as outlined above was followed except that samples were tested after a room temperature dwell time of one hour. Two replicates were made instead of three and the results were averaged. The Dynamic Shear Strength test procedure as outlined above was followed without deviation, and two replicates were run and the results averaged. Average results are presented in Table 5.

TABLE 5

| Ex. No. | Polymer | T-Peel Strength Strip | T-Peel Strength kN/m (lb/in) | Dynamic Shear Strength Strip | Dynamic Shear Strength kN/m² (lb/in²) |
| --- | --- | --- | --- | --- | --- |
| 13 | BACN-4 | A | 1.05 (6.0) | B | 396 (57.5) strip broke |
| 14 | BACN-2 | A | 0.525 (3.0) | B | 350 (50.7) cohesive with adhesive transfer |
| 15 | BACN-1 hot melt | C | 1.52 (8.7) | D | 498 (72.25) clean release |
| 16 | BACN-1 solvent | C | 2.79 (15.95) | C | 429 (62.25) strip broke |

These data show that different T-Peel Strength values may be obtained using different non-tacky, contact-responsive polymers. Examples 15 and 16 also show that higher T-Peel Strength values may be obtained when the tape is made using solvent coating techniques as opposed to hot melt coating techniques. This may be due to the tendency of the BACN polymers to crosslink during hot melt processing.

These data also show that strong bonds are achieved with the present invention in the Dynamic Shear Mode. The strips of Examples 13 and 16 broke prior to polymer/polymer bond failure during the Dynamic Shear Strength test, despite the use of a reinforced strip, indicating the presence of a permanent bond. Example 14 also indicated the presence of a permanent bond by showing cohesive failure during the Dynamic Shear Strength test. The Dynamic Shear Strength value for Examples 15 provides an indication as to the actual bond strength of these tapes since the strips did not fail prior to conclusion of the test.

EXAMPLE 17

Solubility Parameter

This example illustrates that the peel strength of a banding system can be controlled by proper selection of a suitable second or target strip to which a BACN nontacky contact-responsive polymer layer is attached. The example shows that by selecting a target or second strip having a particular solubility parameter, one is able to control the peel strength of the banding tape or system.

BACN-8 was dissolved in MEK and then solvent-coated onto a 0.025 mm (0.00098 in) thick corona treated polyester strip to give a nominal dry thickness of 0.017 mm (0.00067 in). The resulting samples were tested for 180° Peel Strength using a variety of rigid materials having different solubility parameters. A 10-minute dwell time was used. Table 6 demonstrates the variation of 180° Peel Strength as a function of the solubility parameter of the smooth target material. Where available, single point values were used instead of ranges. The solubility parameter of BACN-8 was not itself measured. However, the solubility parameter for a 70 wt. % butadiene, 30 wt. % acrylonitrile is in the range of 9.38–9.48 $(cal/ml)^{1/2}$. It was assumed that the solubility parameter for BACN-8 would be essentially the same.

TABLE 6

| Target Material | Solubility Parameter $(cal/ml)^{1/2}$ | 180° Peel Strength kN/m (lb/in) |
| --- | --- | --- |
| PE | 7.9 | 0 (0) |
| PP | 8.7* | 0.197 (1.13) |
| PS | 9.1 | 0.81 (4.63) |
| PMMA | 9.2 | 1.1489 (6.565) |
| PVC | 9.5 | 1.2583 (7.19) |
| PC | 9.5 | 1.2583 (7.19) |
| PET | 10.7 | 0.569 (3.25) |
| EPOXY | 10.9 | 0.3392 (1.938) |
| CA | 13.4 | 0.0547 (0.313) |
| NYLON | 13.6 | 0.0438 (0.25) |

*This represents the mid-point of the range of solubility parameters found in the open literature.

Table 6 demonstrates that the 180° Peel Strength of a banding tape or system prepared from BACN can be varied by appropriate selection of a target strip having a particular solubility parameter. It is expected that similar results could be obtained using a BACNI nontacky, contact-responsive polymer layer.

EXAMPLE 18

Banding System

A banding system comprising a first elastic strip and a second strip were prepared in this example. The first strip comprised the banding tape of Example 2. The second strip comprised a 0.0508 mm (0.002 in) thick polyester film, both surfaces of which were primed and one surface of which was additionally vapor coated. The first strip had a width of 1.25 cm (0.5 in) and a length of 10.16 cm (4 in). The second strip had a width of 1.59 cm (0.625 in) and a length of 7.62 cm (3 in). A bar code label was attached to the center portion of the second strip. The second strip was then attached to one end of the first strip to form a 1.25 cm long (0.5 in) overlap, and pressure was applied to create a bond therebetween.

A hand-held bunch of about 20 pens was then presented to the banding system so that the bond was centered on the pens. The first strip was stretched and wrapped around the bundle. The stretched strip was then contacted with the taught second strip to form a second overlapping bond which provided a complete enclosure around the pens. The overlapping bond configuration provided a shear mode application of the banding system, which is generally considered to be stronger than peel mode applications.

The banding system held the bunch of pens securely because the elastic strip recovered subsequent to stretching and the formation of the second bond, thereby exerting a compressive force on the bundle which caused the bundle to remain intact. The banding system also provided a bundle having a readable bar code label. The bar coding in this example was provided on a preprinted label. Alternatively, bar coding could be printed on the banding system prior to or after banding of the article. The bar coding may be printed on either strip as long as the dimensions and clarity of the bars are maintained. Thus, for example, it would be possible to print the bar coding on the elastic strip prior to stretching as long as the bar codes remain readable when the elastic strip recovers.

EXAMPLE 19

PSA Elastic Tape

A tape comprising an elastic strip and a pressure sensitive adhesive was prepared in this example. The pressure sensitive adhesive comprised PTR Bostik™ H/M 9016. This adhesive is reported to comply with Section 175.125 of Title 21 of the Code of Federal Regulations for food contact. The tape was prepared by hot melt coating a 0.0508 mm (0.002 in) thick layer of adhesive onto the higher release side of the silicone treated paper liner described in Example 2. Hot melt coating was accomplished using a heated platen unloader with a heated hose leading to a coating die using the same procedure given in Example 2 for coating the tie layer.

An elastic film was then laminated to the adhesive surface to form a composite of elastic film, PSA and liner. The elastic film comprised Strip 4 of Example 1. The resulting tape was found to have a Peak Load of 1.32 kg/cm (7.4 lb/in) and a Percent Recovery of 70.1. The resulting tape was slit into 1.27 cm (0.5 in) rolls and used to bundle green onions. It was also used with automated equipment to bundle carrots and asparagus, and the bonds remained secure.

Two 10.16 cm (4 in) long strips of the tape were cut from a roll of the tape. The liner was partially removed from one end of each strips of tape, and the exposed adhesive surfaces of each tape were contacted together to form a fin seal having a bond area 1.27 cm (0.5 in) wide and 1.27 cm (0.5 in) long. The liner of each tape was then completely removed, and the two free ends of each tape were stretched around a bundle of green onions. The adhesive-bearing ends of each tape were then contacted together while under tension to form a second fin seal. It was estimated that each tape was stretched approximately 25% prior to formation of the second bond, and that upon formation of the second bond, each tape recovered 15%. The elongation and recovery properties of the tape enabled it to securely hold the bundle of onions. These properties would also enable the tape to accommodate any changes in bundle diameter than may occur due to, for example, loss of moisture in the onions.

EXAMPLE 20

Banding System

A banding system was prepared in this example. The banding system consisted of a first strip comprising the PSA tape of Example 19, and a second strip comprising a 0.0729 mm (0.00287 in) thick elastic polyethylene film bearing no adhesive (Example 1, Strip 4). The first strip was 1.27 cm (0.5 in) wide and 10.16 cm (4 in) long. The second strip was 1.59 cm (0.625 in) wide and 10.16 cm (4 in) long. The liner of the first strip was partially removed to expose the PSA. The exposed PSA was contacted with one end of the second strip with pressure to form a fin seal having a bond area 1.27 cm (0.5 in) wide and 1.27 cm (0.5 in) long. The liner of the first strip was then completely removed. The free ends of each strip were then stretched around a bundle of approximately 20 pens so that the adhesive of the first strip faced the bundled pens. The adhesive-bearing end of the first strip was then contacted with the free end of the second strip under pressure to form a second fin seal. It was estimated that each strip was stretched approximately 25% prior to formation of the second bond, and that upon formation of the second bond, each strip recovered 15% leaving a remaining recovery force at a 10% elongation. The elongation and recovery properties of the system enabled it to securely hold the bundle of pens despite any shifting of the pens. The use of a second strip having no adhesive minimizes the mount of adhesive in contact with the bundled article, thereby minimizing chances of contamination of the bundled article with adhesive residue.

The banding system of this example may also comprise bar coding. The bar coding may be applied directly to either strip prior to stretching provided the dimensions and clarity of the bars are maintained.

EXAMPLE 21

Heat Sealed Elastic Strip

A banding system comprising two strips was used in this example to bundle articles using heat. The strips comprised 0.0729 mm (0.00287 in) thick blue elastic polyethylene film (Strip 4 of Example 1). Two strips approximately 1.59 cm (0.625 in) wide and 12.7 cm (5 in) long were cut from the web in the machine direction. An Impulse Sealer, Type TISH-200, from TEW Electric Heating Equipment Co. LTD was used to heat-seal the bond. The two strips were overlapped and placed across the heating element. The sealing unit was a 310 Watt (Impulse), 110 Volt, 50/60 Hz machine. The handle was held closed for approximately one second after the heater turned off. This sealing operation was repeated two to three times to form approximately a 0.405 cm² (0.0625 in²) fin seal on one end. A second fin seal was then formed approximately 6.35 cm (2.5 in) from the first seal.

Approximately 20 pens were inserted into the band that was formed. Since the film had elastic properties, the band stretched to encompass the bunch of pens acting like a rubber band. The heat fusing of the film produced very strong, almost permanent bonds.

This example demonstrates that a banding system having no joining layer may be used to bundle articles of varying diameter. This system could be readily adapted for use with automatic application equipment comprising a heat source. Although this example demonstrates the formation of fin seals, overlapping seals could easily have been made. As an additional comment, it is noted that the elastic film of this example is believed to comply with regulations established by the Food and Drug Administration for materials that contact food, making this system especially useful for bundling certain types of foodstuffs.

EXAMPLE 22

Effect of Tackifying Resin

In this Example, the effect of adding a tackifying resin to the BACN polymer layer is demonstrated.

COATING OF THE NON-TACKY LAYER ONTO A STRIP

Varying amounts of Escorez™ ECR 180, a tackifying resin commercially available from Exxon Chemical Americas, Houston, Tex, were added to 25 wt. % solids content solutions of BACN-8 in MEK. The mixtures were stirred until solutions were obtained. Samples were prepared by hand coating each of the solutions onto the primed side of a 0.038 mm (0.0015 in) thick primed PET strip material. The coated PET strip material was dried for about 15 minutes at about 65° C. (149° F.) in a forced air oven to produce a coated strip having a non-tacky layer of about 0.05 mm (0.002 in) thick.

Test strips were prepared and tested according to the procedure described above for T-Peel Strength except that the test strips were allowed to dwell at room temperature for 2 minutes before testing. Additionally, test strips were prepared using the strip material of Examples 5–12 (0.039 mm (0.00155 in) thick white PET) as the target strip. Dwell time before testing was 2 minutes. The amount of tackifying resin used and the T-Peel Strength values are reported in Table 7 below. All values are the average of two replicates.

TABLE 6

| Amount of tackifier | T-Peel Strength kN/m (lb/in) | |
|---|---|---|
| (parts per hundred parts of rubber) | Polymer/Polymer | Polymer/PET |
| 0 | 0.44 (2.50) | NT |
| 5 | 0.96 (5.48) | 0.0315 (0.18) |
| 10 | 1.80 (10.28) | 0.026 (0.15) |
| 20 | 2.63 (15.03) | 0.035 (0.20) |

Table 6 demonstrates that the T-Peel Strength can be improved by the addition of tackifying agent for a system. The joining layer remained nontacky up to and including a tackifier loading of 20% by weight.

EXAMPLE 23

Bar Coded Elastic Strip

Strip 6 from Example 1 was bar coded and stretched. The quality of the printing was evaluated in an unstretched and stretched condition. The bar code was printed using a Zebra Z130 thermal transfer printer (commercially available from Zebra Technologies Inc, located in Northbrook, Ill.), a burn setting of zero, and a Sato Standard wax ink ribbon (commercially available from Sato Corporation). A bar code having a width of 12.7 mm (0.5 in) and a length of 38.2 mm (1.50 in) was printed onto the strip in the machine direction. The bar coded portion was cut from the strip. One end was affixed to a flat surface using tape while the other end was stretched to a length of 49.0 mm (1.93) to provide an approximate elongation of 28.3%. The print quality was determined using a PSC Quick-Check 5 verifier (commercially available from Photographic Sciences Corp, located in Webster, N.Y.), a wand aperture of 6 mils, and a wavelength of 633 nanometers. The algorithms specified in ANSI X3.182-1990 were used by the verifier in determining print quality.

The verifier provided a scoring of "A" for the bar code in the unstretched and stretched condition, this score being the best score attainable. This scoring indicates that the bar code could be read in either the unstretched or stretched condition. Thus, the elastic strip of the invention could be bar coded and read by scanners even after an elongation of 28.3%. It appears that the bar code remains readable upon elongation provided that the bar code proportions are preserved.

We claim:

1. A banding system for securing one or more objects in compression, said system comprising:
    (a) a first strip of an elastic polymeric material having first and second ends, said material having at least a 50% recovery after being elongated to 100% of its original length; and
    (b) a second strip of material having first and second ends, wherein said first ends of said first and second strips are capable of being bonded together and second ends of said first and second strips are capable of being bonded together by a nontacky joining layer to form an enclosure.

2. A banding system according to claim 1, wherein said nontacky layer is a contact-responsive polymer layer.

3. A banding system according to claim 1, wherein said joining layer is fusible.

4. A banding system according to claim 2, wherein the solubility parameter of said nontacky, contact-responsive polymer layer is sufficiently close to the solubility parameter of the material of at least one of said strips to enable the formation of a bond therebetween.

5. A banding system according to claim 1, further comprising a tie layer interposed between said joining layer and said strip to which said joining layer is applied.

6. A banding system according to claim 1, wherein a bond is formed between said first and second strips.

7. A banding system according to claim 6, wherein said bond has a T-Peel Strength or a Dynamic Shear Strength Value upon bond formation at least equal to a remaining recovery force of said first strip.

8. A banding system according to claim 6, wherein said bond is permanent.

9. A banding system according to claim 1, wherein at least one of said strips is capable of accepting indicia.

10. A banding system according to claim 1, wherein the material of each of said first and second strips is flexible.

11. A banding system according to claim 1, wherein said second strip comprises an elastic polymeric material.

12. A banding system according to claim 1, wherein each of said first and second strips comprises a thermoplastic material.

13. A banding system according to claim 1, wherein said joining layer comprises a normally tacky pressure sensitive adhesive applied to said first strip and wherein said second strip comprises an elastic polymeric material.

14. A banding system according to claim 1, wherein said second strip further comprises a normally tacky pressure sensitive adhesive applied thereto, wherein upon contacting said first strip and said second strip a bond is formed between the joining layer on said first strip and said normally tacky pressure sensitive adhesive on said second strip.

15. A banding system according to claim 1, wherein said first strip further comprises a layer of nontacky, contact-responsive polymer applied to said elastic polymeric material, and said second strip comprises an elastic polymeric material having a solubility parameter sufficiently close to the solubility parameter of said nontacky, contact-responsive polymer so that when said first and second strips are brought into contact so that said nontacky, contact-responsive polymer layer is interposed therebetween, a bond is formed.

16. A banding system according to claim 1, wherein said second strip further comprises a layer of nontacky, contact-responsive polymer, and said first strip comprises an elastic polymeric material having a solubility parameter sufficiently close to the solubility parameter of said nontacky, contact-responsive polymer so that when said first and second strips are brought into contact so that said nontacky, contact-responsive adhesive is interposed therebetween, a bond is formed.

17. An elastic banding tape for securing one or more objects in compression comprising:
    (a) a strip of elastic polymeric material having first and second ends and an inner surface and an outer surfaces, the strip having at least a 50% recovery after being elongated to 100% of its original length; and
    (b) a nontacky joining layer on at least a portion of one of said surfaces capable of joining the first and second ends to form an enclosure.

18. An elastic banding tape according to claim 17, wherein said tape is capable of being extended, wrapped and secured around said object(s) and recovering so as to hold said object(s) in compression.

19. An elastic banding tape according to claim 17, wherein said nontacky layer is a contact-responsive polymer layer.

20. An elastic banding tape according to claim 19, wherein the solubility parameter of said nontacky, contact-responsive polymer layer is sufficiently close to the solubility parameter of said elastic polymeric material so that when said polymer layer is brought into contact with one of said surfaces of said elastic polymeric material, a bond is formed therebetween.

21. An elastic banding tape according to claim 19, wherein said nontacky, contact-responsive polymer layer comprises a polymer selected from the group consisting of butadiene-acrylonitrile and butadiene-acrylonitrile-isoprene.

22. An elastic banding tape according to claim 17, wherein said nontacky layer is fusible.

23. An elastic banding tape according to claim 17, wherein said elastic polymeric material is flexible.

24. An elastic banding tape according to claim 17, further comprising a tie layer interposed between said nontacky layer and said surface to which it is applied.

25. An elastic banding tape according to claim 17, wherein said elastic banding tape is secured around said object(s) by the formation of one or more bond.

26. An elastic banding tape according to claim 17, wherein said elastic banding tape is secured around said object(s) by the formation of one or more permanent bonds.

27. One or more objects held in place by a compressive force, comprising one or more objects and a banding system securing said object(s) together, said banding system comprising:
    (a) a first strip of an elastic polymeric material, said material having at least a 50% recovery after being elongated to 100% of its original length; and
    (b) a second strip of material, wherein said first and second strips are capable of being bonded together compressively around the objects by a nontacky joining layer.

28. One or more objects according to claim 27, wherein said banding system has been extended, wrapped and bonded and allowed to at least partially recover to secure said one or more objects by exerting a compressive force thereon.

29. One or more objects held in place by compressive force, comprising: one or more of said objects and an elastic banding tape securing said object(s) together into a bundle, said elastic banding tape comprising:
    (a) a strip of an elastic polymeric material having inner and outer surfaces and having at least a 50% recovery after being elongated to 100% of its original length; and (b) a nontacky layer on at least a portion of one of said surfaces.

30. One or more objects according to claim 29, wherein said elastic banding tape has been extended, wrapped and bonded and allowed to at least partially recover to secure said one or more objects together by exerting a compressive force thereon.

31. An elastic band for securing one or more objects in compression, comprising:
   (a) a strip of an elastic polymeric material having inner and outer surfaces, first and second ends, and having at least a 50% recovery after being elongated to 100% of its original length, the strip comprising a nontacky joining layer on at least a portion of one of said surfaces capable of joining the first and second ends to form an enclosure; and
   (b) a bar code printed on at least a portion of said surfaces of said strip.

32. An elastic banding tape according to claim 31, wherein said tape further comprises a joining layer on at least a portion of one of said surfaces of said strip.

33. An elastic banding tape according to claim 32, wherein said joining layer comprises a normally tacky pressure sensitive adhesive.

34. A bundle of objects according to claim 27, wherein said objects comprise a perishable object.

35. A bundle of objects according to claim 29, wherein said objects comprise a perishable object.

36. A banding system for securing one or more objects in compression, said system comprising:
   (a) a first strip of an elastic polymeric material, said material having at least a 50% recovery after being elongated to 100% of its original length and
   (b) a second strip of material, wherein at least one of said first and said second strips bears a nontacky joining layer on at least a portion thereof such that said first and second strips are capable of being bonded together compressive around the objects.

37. One or more objects held in place by a compressive force, comprising one or more objects and a banding system securing said object(s) together, said banding system comprising:
   (a) a first strip of an elastic polymeric material, said material having at least a 50% recovery after being elongated to 100% of its original length; and
   (b) a second strip of material, wherein at least one of said first and said second strips bears a nontacky joining layer on at least a portion thereof such that said first and second strips are capable of being bonded together compressively around the objects.

* * * * *

UNITED STATES PATENT AND TRADEMARK OFFICE
CERTIFICATE OF CORRECTION

PATENT NO.: 5,733,652

DATED: March 31, 1998

INVENTOR(S): Alesia A. Stowman and James J. Kobe

It is certified that error appears in the above-identified patent and that said Letters Patent is hereby corrected as shown below:

Front page, column 2, line 5, "92/22619" should read -- WO 92/22619 --;

Column 12, line 46, "DN-1201 L" should read -- DN-1201L --;

Column 16, lines 26, "mount" should read -- amount --;

Column 17, line 48, "$^a$Quantum" should read -- $^1$Quantum --;

Column 21, line 10, "2.5 cm" should read -- 2.54 cm --;

Column 25, line 17, "mount" should read -- amount --';

Column 26, line 24, "TABLE 6" should read -- TABLE 7 --;

Column 26, line 33, "Table 6" should read -- Table 7 --;

Column 26, line 51, "(1.93)" should read -- (1.93 in) --;

UNITED STATES PATENT AND TRADEMARK OFFICE
CERTIFICATE OF CORRECTION

PATENT NO.: 5,733,652

DATED: March 31, 1998

INVENTOR(S): Alesia A. Stowman and James J. Kobe

It is certified that error appears in the above-identified patent and that said Letters Patent is hereby corrected as shown below:

Column 28, line 41, after "bond", insert the following: -- having a T-Peel Strength or a Dynamic Shear Strength Value upon bond formation at least equal to a remaining recovery force of said first strip --

Column 29, line 8, "band" should read -- banding --; and

Column 30, line 12, "compressive" should read -- compressively --.

Signed and Sealed this

Fifteenth Day of May, 2001

Attest:

NICHOLAS P. GODICI

Attesting Officer

Acting Director of the United States Patent and Trademark Office